(12) United States Patent
Korn et al.

(10) Patent No.: US 9,657,651 B2
(45) Date of Patent: May 23, 2017

(54) INTAKE PIPE FOR GAS OF AN INTERNAL COMBUSTION ENGINE WITH A FLAP UNIT

(71) Applicant: MANN+HUMMEL GMBH, Ludwigsburg (DE)

(72) Inventors: Alexander Korn, Gueglingen (DE); Herbert Pietrowski, Pleidelsheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 434 days.

(21) Appl. No.: 14/249,494

(22) Filed: Apr. 10, 2014

(65) Prior Publication Data

US 2014/0305523 A1 Oct. 16, 2014

(30) Foreign Application Priority Data

Apr. 11, 2013 (DE) .................. 10 2013 006 196

(51) Int. Cl.
*F16K 1/22* (2006.01)
*F02D 9/10* (2006.01)

(52) U.S. Cl.
CPC .......... *F02D 9/1095* (2013.01); *F02D 9/107* (2013.01); *F16K 1/22* (2013.01); *F02D 9/1035* (2013.01); *Y10T 137/7902* (2015.04)

(58) Field of Classification Search
CPC .... F02D 9/1095; Y10T 137/7902; F16K 1/22; F16K 1/224
USPC ..... 251/305, 308, 306, 314, 316; 123/41.04, 123/58.9, 337
See application file for complete search history.

(56) References Cited

U.S. PATENT DOCUMENTS

| | | | |
|---|---|---|---|
| 6,138,988 A | 10/2000 | Bouvet et al. | |
| 6,505,643 B2 * | 1/2003 | Scholten | F02D 9/1035 |
| | | | 123/337 |
| 7,162,997 B2 * | 1/2007 | Madeira | F02B 31/085 |
| | | | 123/336 |
| 7,234,444 B2 * | 6/2007 | Nanba | F02D 9/1045 |
| | | | 123/337 |
| 7,353,801 B2 * | 4/2008 | Winkelmuller | F02D 9/1015 |
| | | | 123/336 |
| 2002/0023347 A1 | 2/2002 | Hannewald et al. | |
| 2002/0056824 A1 | 5/2002 | Rentschler et al. | |
| 2004/0003841 A1 | 1/2004 | Rentschler et al. | |
| 2005/0241614 A1 | 11/2005 | Madeira | |

(Continued)

FOREIGN PATENT DOCUMENTS

DE 102008049019 A1 4/2010

*Primary Examiner* — Craig Schneider
*Assistant Examiner* — Andrew J Rost
(74) *Attorney, Agent, or Firm* — James Hasselbeck

(57) ABSTRACT

An intake pipe for intake gas of an internal combustion engine has an intake pipe channel and a flap unit with a flap shaft and a flap fixedly arranged on the flap shaft. The flap unit alternatingly opens or closes the intake pipe channel. A hollow insert body is disposed in the intake pipe channel, wherein the flap unit is arranged in the insert body and the flap is positioned in a hollow interior of the insert body. The insert body has opposite end faces and the opposite end faces are open. The flap shaft extends through opposite walls of the insert body in a radial direction relative to an insert body axis of the insert body. The insert body is rotatable on the flap shaft. A radial inner circumferential side of the insert body widens toward at least one of the open end faces.

9 Claims, 6 Drawing Sheets

(56) References Cited

U.S. PATENT DOCUMENTS

| | | | |
|---|---|---|---|
| 2007/0051339 A1* | 3/2007 | Torii | F02B 31/08 |
| | | | 123/336 |
| 2008/0035094 A1* | 2/2008 | Torii | F02D 9/103 |
| | | | 123/188.14 |
| 2008/0053401 A1* | 3/2008 | Kondo | F02D 9/1035 |
| | | | 123/337 |
| 2013/0037734 A1 | 2/2013 | Kerschbaumer | |
| 2013/0160736 A1* | 6/2013 | Matsuzaki | F02D 9/1075 |
| | | | 123/337 |

* cited by examiner

INTAKE PIPE FOR GAS OF AN INTERNAL COMBUSTION ENGINE WITH A FLAP UNIT

CROSS-REFERENCE TO RELATED APPLICATION

This application claims the benefit of German patent application No. 10 2013 006 196.2 filed Apr. 11, 2013, the entire contents of the aforesaid German patent application being incorporated herein by reference.

BACKGROUND OF THE INVENTION

The present invention concerns an intake pipe for intake gas, in particular intake air, of an internal combustion engine, in particular of a motor vehicle, comprising at least one intake pipe channel and at least one flap unit for selectively opening or closing at least one intake pipe channel. The flap unit has a flap shaft and at least one flap that is fixedly arranged on the flap shaft and is arranged in the intake pipe channel within a hollow insert body that is open at opposite end faces. The flap shaft extends in radial direction relative to an insert body axis through circumferential walls of the insert body. The insert body is rotatable on the flap shaft.

US 2010/0071977 A1 discloses an intake pipe of an internal combustion engine, in particular of a motor vehicle, comprising at least one intake pipe channel and at least one flap unit arranged in an intake pipe for selectively opening or closing the channel. The flap unit has a flap shaft and at least one flap that is arranged fixedly on the flap shaft. For each flap a cylindrical bearing bracket is provided through which the flap shaft passes in radial direction. The flap is arranged within the bearing bracket. The bearing bracket is slidably supported on the flap shaft in axial direction relative to the flap shaft. Also, the bearing bracket is supported on the flap shaft so as to be rotatable about it.

The invention has the object to design an intake pipe of the aforementioned kind in which a flow characteristic of the intake gas flowing through the intake pipe channel and the insert body is further improved. In particular, a flow course through the insert body is to be improved. Moreover, possible pressure losses between the gas inlet side and the gas outlet side of the insert body are to be reduced in particular.

SUMMARY OF THE INVENTION

This object is solved according to the invention in that the radial inner circumferential side of the insert body widens at least toward one open end face.

The intake pipe channel is delimited by several wall sections. The radial inner circumferential side of the insert body forms a wall section that delimits the intake pipe channel. The intake gas can be clean air or combustion air mixed with clean air which is supplied to the internal combustion engine for combustion with an appropriate fuel. Instead of air, a different kind of oxygen-containing gas mixture can be provided also. The intake pipe can have several intake pipe channels, appropriate flaps, and insert bodies.

According to the invention, an interior of the insert body widens toward at least one open end face. In this way, a flow course of the gas which is flowing through the intake pipe channel is improved. By widening the interior of the insert body, a flow course of the intake gas upon entry and/or upon exit and/or within the insert body can be improved. Advantageously, a continuous transition between the radial inner circumferential side of the insert body and at least one further adjoining section of the intake pipe channel can be realized. In this way, possible turbulence at the transition between the insert body and the at least one adjoining section of the intake pipe channel can be reduced, preferably prevented.

Advantageously, the radial inner circumferential side of the at least one insert body can widen to both open end faces. In this way, the interior of the at least one insert body can have its smallest diameter at a location where the edges of the flap are located in a closed state of the flap unit. Accordingly, in the closed state a possible flap gap between the at least one flap and the radial inner circumferential side of the insert body can be reduced. Moreover, the gas inlet side as well as the gas outlet side of the insert body can be improved with regard to flow mechanics.

Advantageously, the radial inner circumferential side of the at least one insert body can widen progressively or degressively toward the at least one open end face. The course of the radial inner circumferential side can be curved in profile in the direction of the insert body axis, in particular approximately S-shaped. The inner diameter of the insert body in the area of the flap shaft can first increase in outward direction greatly, in particular progressively, so that, when opening the at least one flap, the flap gap between the radial outer flap edge and the radial inner circumferential side of the insert body can enlarge progressively and thus quickly. In the vicinity of the at least one open end face, the inner diameter of the at least one insert body can increase slightly, in particular degressively. Accordingly, the inner contour of the insert body can adapt uniformly to the inner contour of the radial inner circumferential side of the adjoining section of the intake pipe channel. In this way, the flow transitions can be further improved.

Advantageously, the at least one insert body can be functionally separate from the bearing elements for the flap shaft. In this way, the insert body can be optimized with regard to affecting the flow of the intake gas.

Advantageously, the insert body can be arranged so as to be axially slidable relative to the shaft axis in an insert body receptacle provided at the housing. Advantageously, the insert body receptacle can have a receiving section for the insert body and a channel section which serves for guiding the flow. Accordingly, the insert body receptacle can be optimized, on the one hand, in the receiving section with regard to its receiving function and, on the other hand, in the channel section with regard to affecting the flow, respectively.

Due to the slidability of the insert body relative to the intake pipe housing, in particular to the insert body receptacle, possible differences in the thermal expansion of the flap, the flap shaft, the intake pipe housing and/or the insert body can be compensated. In this way, in case of manufacturing-related and/or operation-related tolerances of the above listed components, a flap gap can be realized that is uniform when opening of the flap.

By combining the inner circumferential side of the insert body that widens relative to the at least one open end face and its slidable arrangement relative to the shaft axis, operation-related tolerance changes of the components which are caused, for example, by a thermal expansion, can be compensated even better. In this way, it is not necessary to provide in the closed position of the flap a sickle-shaped flap gap in order to compensate possible tolerances and to prevent that the at least one flap might jam as a result of operation-related dimensional changes. A sickle-shaped flap gap known on the market may cause leakage in the area of the at least one flap. Such leakage can negatively affect the performance characteristics, in particular the thermodynamics, of the internal combustion engine.

Advantageously, the at least one flap can be arranged free of clearance on the flap shaft. In this way, wear of the flap and/or of the flap shaft, in particular by operation-related vibrations, pulsations, can be reduced. Advantageously, the at least one flap can be arranged form-fittingly on the flap shaft. In particular, it can be injection-molded to or on the flap shaft.

Advantageously, on the flap shaft at least one follower element can be arranged with which the flap shaft can entrain the insert body axially relative to the shaft axis. The at least one follower element can serve as a stop for the insert body. With regard to the insert body axis, it can be arranged radially outwardly, radially inwardly or within the circumferential wall of the insert body. Advantageously, at least one follower element can be a follower collar, in particular a disk that is coaxial relative to the shaft axis. The at least one follower element can be attached on or at the flap shaft or can be connected monolithically or in a multi-part configuration therewith. Alternatively or additionally, the at least one flap can have a follower function.

In an advantageous embodiment, an inner diameter of the insert body relative to the insert body axis can correspond, at axial height of a shaft axis of the mounted flap shaft, to an outer diameter of the at least one flap. In this way, the flap gap in the closed position of the at least one flap can be further reduced. Preferably, in this way a flap gap can be prevented. Accordingly, leakage through the intake pipe channel when the flap is closed can be further reduced, preferably avoided.

In a further advantageous embodiment, the insert body can be slidable relative to an intake pipe housing axially relative to the shaft axis. In this way, positional changes of the at least one flap in the intake pipe channel can be compensated by the movability of the insert body. For example, the at least one flap itself can be connected fixedly and secured against sliding on the flap shaft. Possible positional changes of the at least one flap can be caused in particular by different thermal expansions of the involved components. Advantageously, the insert body can be slidable axially relative to the shaft axis in an insert body receptacle of the housing.

In a further advantageous embodiment, the insert body can be arranged in an insert body receptacle of a bearing support, in which the flap shaft is supported, so as to be slidable in the direction of the shaft axis. In this way, the bearing support can serve additionally for receiving the insert body. The bearing support can be a separate component arranged in the intake pipe housing of the intake pipe.

Advantageously, the bearing support can have at least one fastening element, in particular a welding anvil, with which it is secured on or in the intake pipe housing. The bearing support can advantageously be arranged in a bearing support receptacle of the intake pipe housing.

Advantageously, the bearing support can be of a multi-part, in particular two-part, configuration. The parts of the bearing support can each have appropriate fastening elements for fastening on the intake pipe housing and corresponding sections of the insert body receptacle. Advantageously, in a two-part bearing support each of the two bearing support parts can have a bearing for the flap shaft. A multi-part, in particular two-part, bearing support can be connected simply with the intake pipe housing. Moreover, a multi-part, in particular two-part, bearing support can be connected simply with the flap shaft.

Advantageously, the bearings of the flap shaft in the bearing support can each have a bearing bushing, in particular plain bearing bushings, which can improve the support action, in particular reduce friction losses upon rotation of the flap shaft.

Advantageously, a radial inner circumferential side of the insert body receptacle, in particular of the receiving section, can be approximately complementary to the radial outer circumferential side of the insert body. In this way, the insert body can be positioned simply and stably in the insert body receptacle, in particular the receiving section. Advantageously, the radial outer circumferential side of the insert body can be round, oval or angular. Correspondingly, the radial inner circumferential side of the receiving section can be round, oval or angular. With an angular or oval circumferential side, an orientation of the insert body relative to the insert body axis in the insert body receptacle can be simplified.

In a further advantageous embodiment, an inner contour of the radial inner circumferential side of the insert body can pass into an inner contour of the radial inner circumferential side of an insert body receptacle. In this way, a flow transition between the insert body and the insert body receptacle can be improved.

In a further advantageous embodiment, a radial inner circumferential side of the insert body receptacle can widen, viewed in axial direction away from the insert body. Advantageously, a channel section of the insert body receptacle can widen accordingly. The channel section can form a section of the intake pipe channel. In this way, the flow guiding action can be further improved.

In a further advantageous embodiment, an inner contour of the radial inner circumferential side of a section of the intake pipe channel, that is neighboring the insert body or optionally an insert body receptacle, can pass into an inner contour of the radial inner circumferential side of the insert body or the insert body receptacle. The neighboring section of the intake pipe channel can be part of the intake pipe housing, in particular optionally of a bearing support receptacle for an optional bearing support. Advantageously, the neighboring section of the intake pipe channel can widen on its side that is facing the insert body. In this way, a flow course through the intake pipe channel at the gas inlet side and the gas outlet side of the insert body or optionally of the insert body receptacle can be further improved.

In a further advantageous embodiment, at the intake pipe housing, in particular optionally at or in the bearing support, at least one guide element can be arranged for guiding the insert body axially relative to the shaft axis. By means of the at least one guiding element the insert body can be guided when moving axially relative to the shaft axis. Moreover, the at least one guiding element can be designed such that a rotation of the insert body relative to the intake pipe housing, in particular relative to an insert body receptacle, optionally to the bearing support, about the shaft axis and/or a sliding action of the at least one insert body perpendicular to the shaft axis can be limited, in particular prevented. Moreover, the at least one guiding element can serve additionally for holding the insert body on or in the intake pipe housing, in particular in the insert body receptacle.

In a further advantageous embodiment, the at least one guiding element can have a guiding pin or a pin opening which extends parallel to the shaft axis, wherein the guide pin, moveable axially relative to the shaft axis, can engage an appropriate pin opening of the insert body or the pin opening is engaged by a guide pin of the insert body. The guide pin which extends axially relative to the shaft axis can be guided in the pin opening upon movement of the insert body relative to the intake pipe housing, in particular relative to the insert body receptacle. Moreover, it can thus be prevented in a simple way that the insert body relative to the intake pipe housing, in particular to the insert body receptacle, can rotate about the shaft axis or is displaced in a direction perpendicular to the shaft axis. In combination with a two-part bearing support, the pin openings and the guide pins can be oriented parallel to a mounting direction of the bearing support parts in which the two bearing support parts are joined. In this context, the guide pins/pin openings of the insert body and of a first bearing support part can be inserted into each other. Subsequently, the second bearing support part can be simply pushed on wherein the guide pins/pin openings provided thereat can be connected with the corresponding guide pins/pin openings of the insert body. In this way, the insert body can be arranged in a simple way in the insert body receptacle of the bearing support and can be secured slidably in axial direction relative to the shaft axis. The two bearing support parts can also be simultaneously pushed onto the insert body.

In a further advantageous embodiment, the insert body can be provided on radial opposite circumferential walls with a shaft passage, respectively, for passing through the flap shaft and a respective insertion slot can extend from the shaft passages to one of the open end faces of the insert body for introducing the flap shaft into the shaft passages. Advantageously, the insertion slots can be open toward one of the open end faces of the insert body. The insertion slots can serve as an insertion opening for the flap shaft. In this way, the flap shaft can be positioned in a simple way from the open end face of the insert body into the appropriate shaft passages. Subsequently, the insert body with the flap shaft can be connected with the intake pipe housing or optionally with the bearing support. The insertion slots advantageously extend axially relative to the insert body axis. When using a bearing support, which can be arranged separately in the intake pipe housing, first the bearing support can be connected with the flap shaft and the insert body. Subsequently, the thus joined unit can be inserted into the intake pipe housing.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in combination in the drawing, the description, and the claims also individually and combine them to other meaningful combinations.

In the Figures, same components are provided with same reference characters.

DESCRIPTION OF PREFERRED EMBODIMENTS

Figure 1:
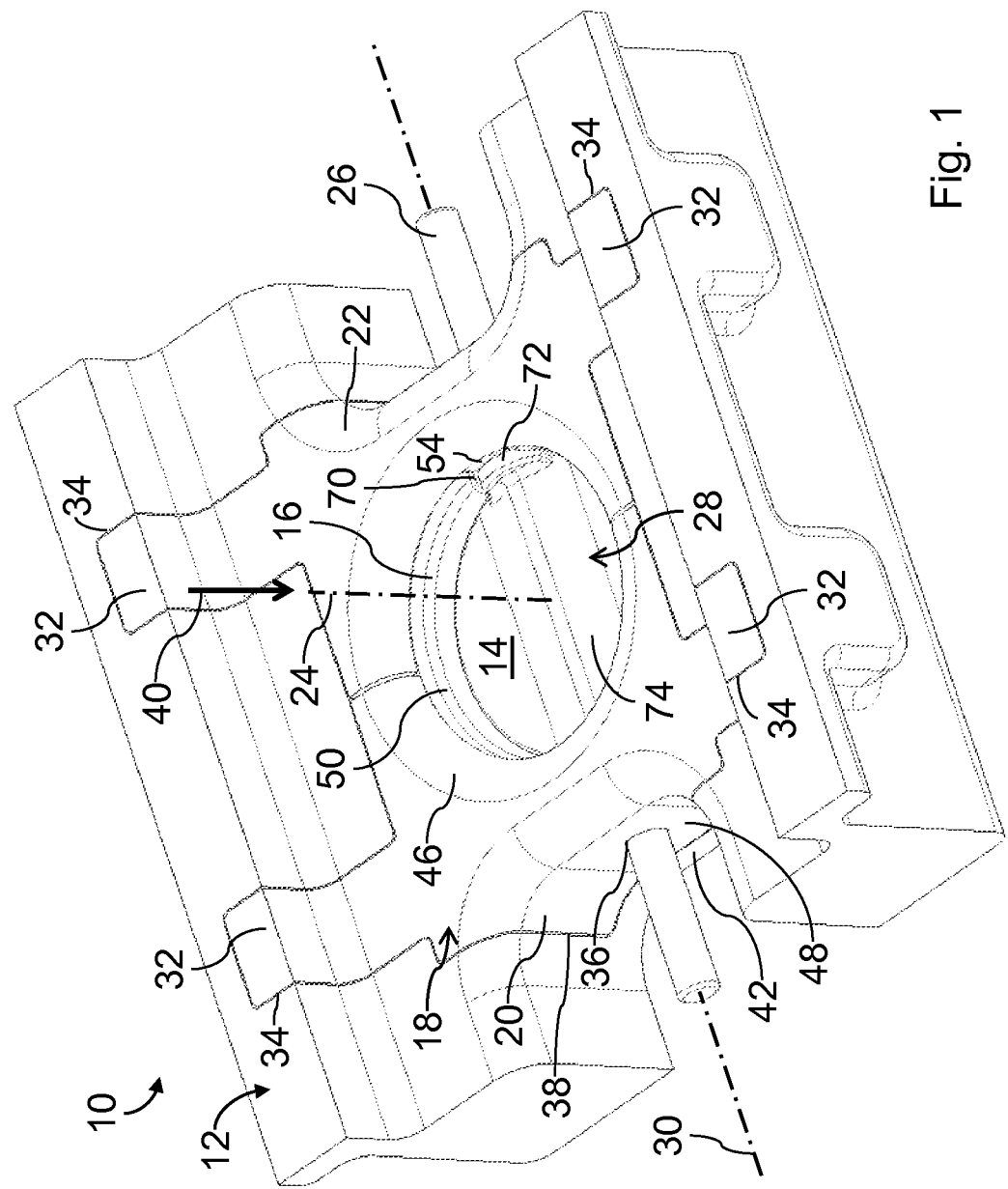
FIG. 1 shows in isometric illustration a detail of an intake pipe of an internal combustion engine with a flap unit for opening and closing an intake pipe channel and with an insert body in which a flap of the flap unit is arranged.
Figure 2:
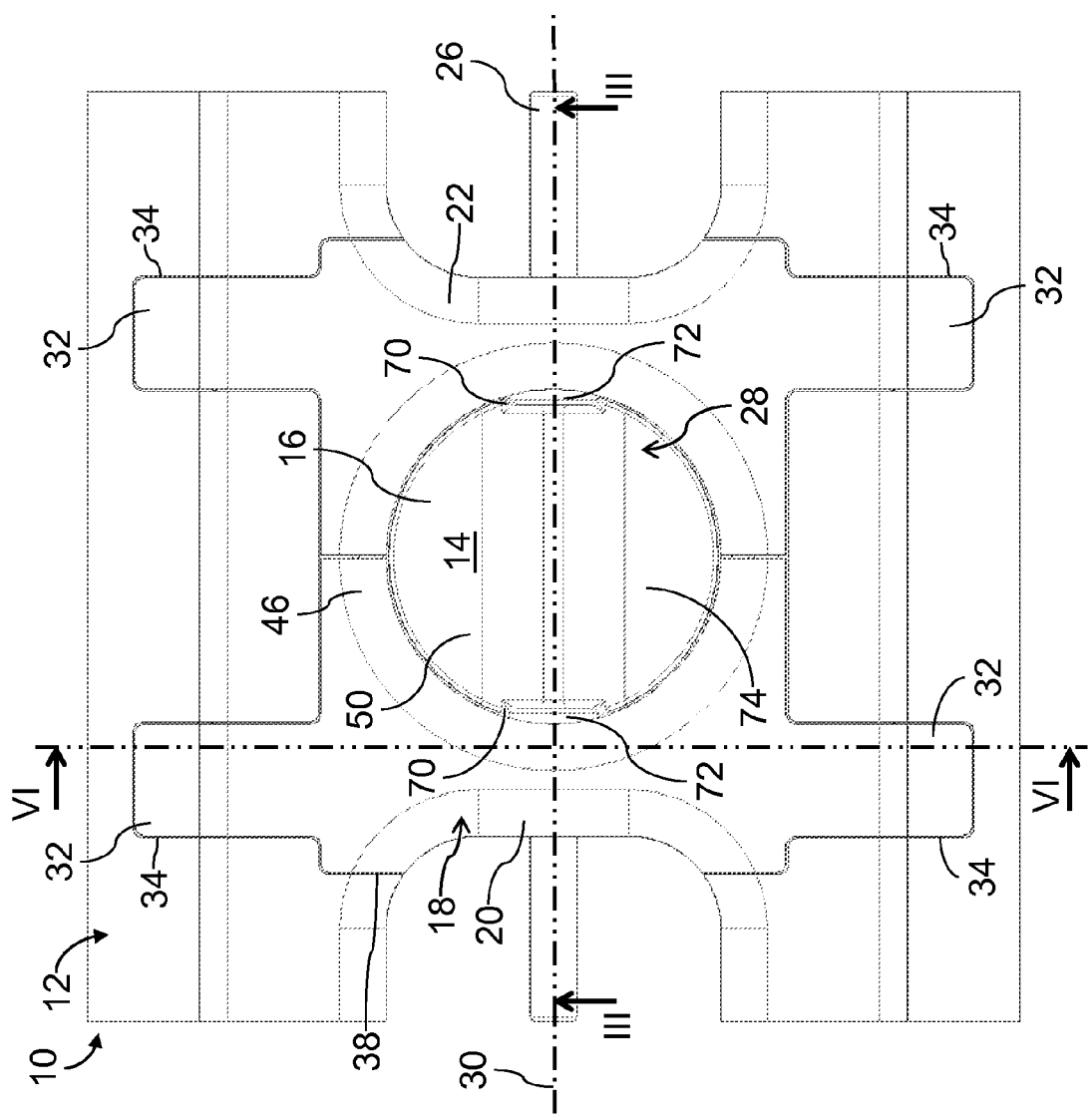
FIG. 2 is a plan view of the intake pipe section of FIG. 1.

In FIGS. 1 through 6, a detail of an intake pipe 10 of an internal combustion engine of a motor vehicle is illustrated in different perspectives and section views. The intake pipe 10 is arranged in an intake manifold of the internal combustion engine. The intake pipe 10 is a switching intake pipe in which flow paths for intake air required for combustion can be opened or closed depending on an operating state of the internal combustion engine, for example an engine speed.

FIGS. 1 to 4 and 6 show a detail of a housing part 12 of the intake pipe 10. An intake pipe channel 14 through which intake air is guided extends through the housing part 12. The intake pipe channel 14 has a round cross-section. As a whole, the intake pipe 10 comprises several such intake pipe channels 14 which are substantially of similar configuration with respect to the invention. The intake pipe channel 14 is delimited by several wall sections which will be explained in more detail in the following.

The intake pipe channel 14 passes through a channel passage 16 of a bearing support 18. The intake pipe channel 14 and the channel passage 16 are coaxial to a channel axis 24.

The bearing support 18 is comprised of two bearing support halves 20 and 22 which are combined to the bearing support 18. The bearing support halves 20 and 22 are butt joint-mounted with an air gap in a plane in which the channel axis 24 is extending. They each form one half of the channel passage 16.

In the bearing support 18, a flap shaft 26 of a flap unit 28 is supported and is rotatable about an imaginary shaft axis 30. The shaft axis 30 extends perpendicular to the channel axis 24 and perpendicular to the contact plane of the bearing support halves 20 and 22.

On opposite sides of a plane, defined by the shaft axis 30 and the channel axis 24, each of the bearing support halves 20 and 22 has a welding anvil 32, respectively. The welding anvils 32 are arranged each in appropriate recesses 34 in the housing part 12 and are welded to the housing part 12. An outer contour of the bearing support 18 passes into an outer contour of the housing part 12.

Each bearing support half 20 and 22 has a bearing receptacle 36 in which a plain bearing bushing for the flap shaft 26 is arranged, respectively. The plain bearing bushings are not illustrated in the FIGS. 1 to 6 for better clarity. The bearing receptacles 36 and the plain bearing bushings are arranged coaxially to the shaft axis 30. The bearing receptacles 36 are axially continuous.

Figure 3:
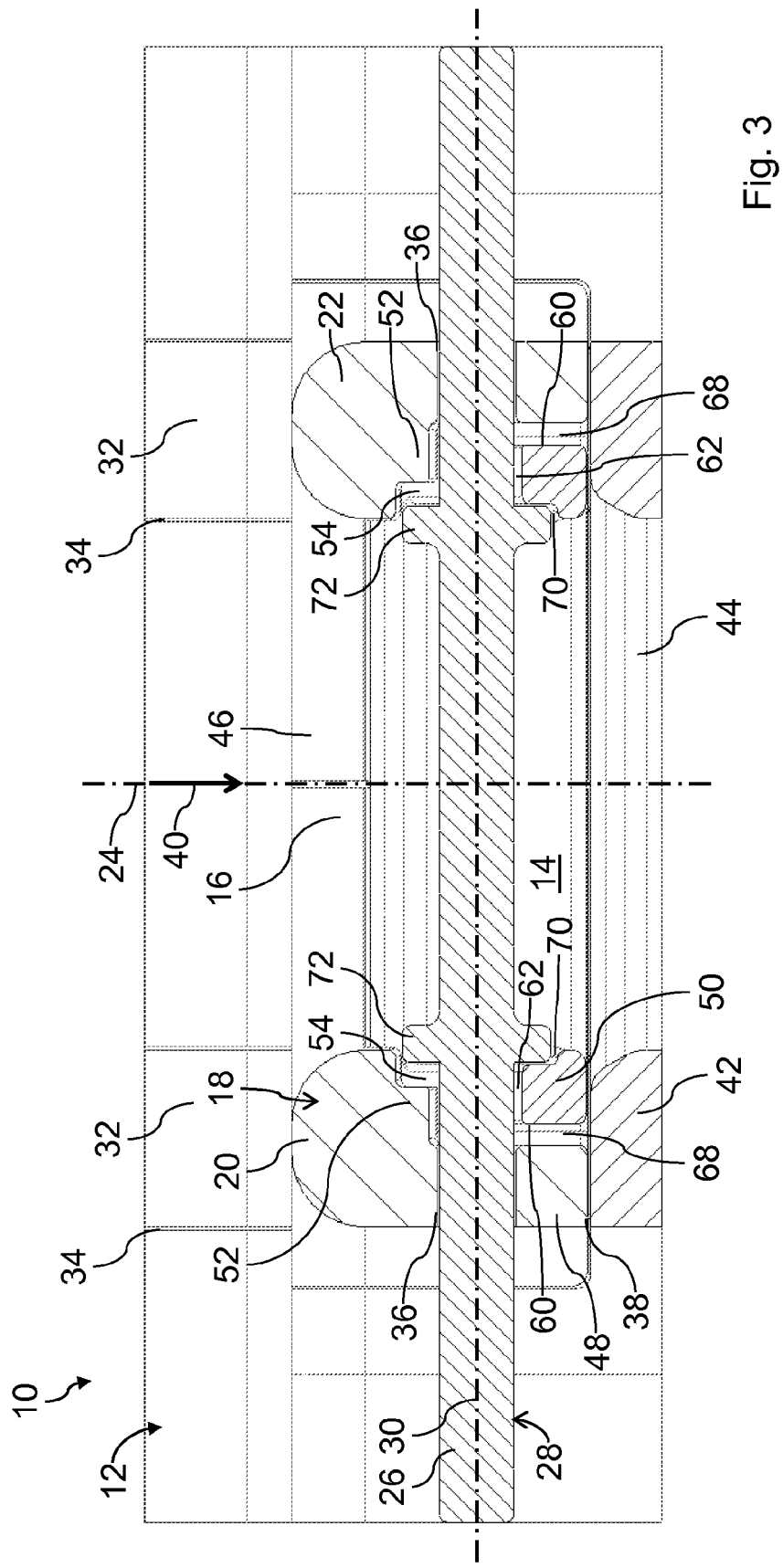
FIG. 3 shows a first longitudinal section of the intake pipe section of FIG. 2 along a section line III-III shown therein.
Figure 4:
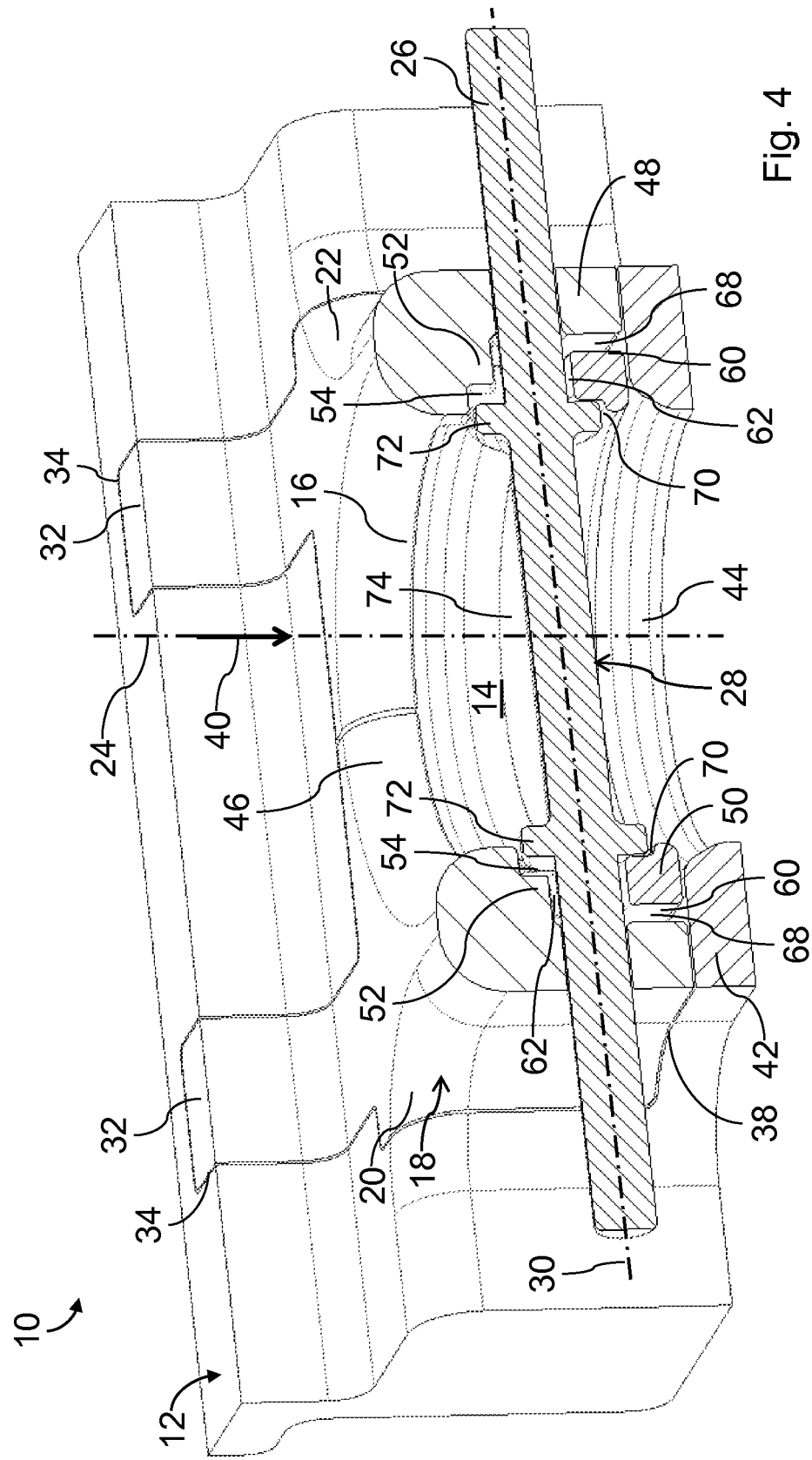
FIG. 4 is an isometric illustration of the sectioned intake pipe section of FIG. 3.
Figure 5:
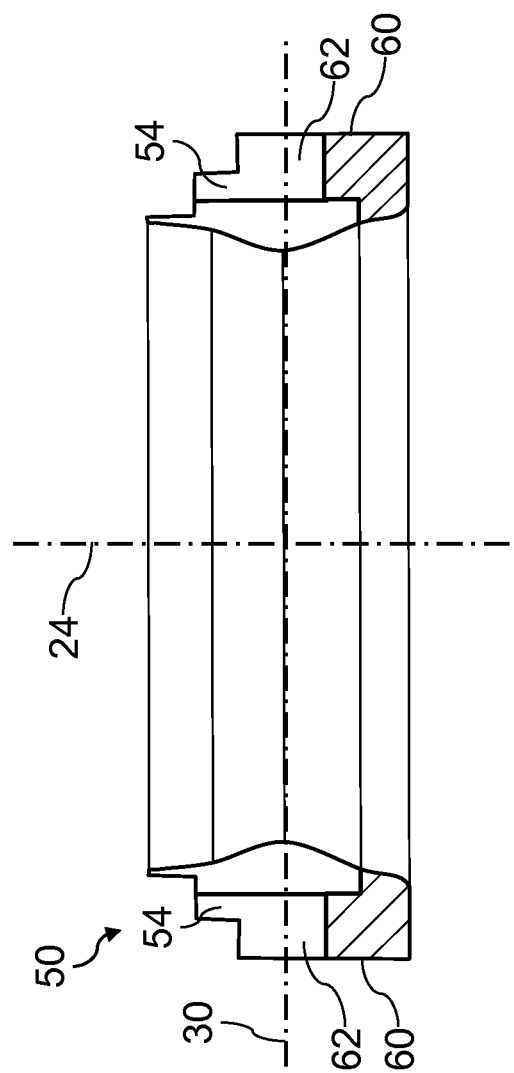
FIG. 5 shows the insert body of FIGS. 1 through 4 in a longitudinal section along a section plane which corresponds to the section plane of the first longitudinal section of FIGS. 3 and 4.

The bearing support 18 is inserted into a bearing support receptacle 38 of the housing part 12. An insertion direction of the bearing support 18 into the bearing support receptacle 38 is parallel to the channel axis 24 and is indicated by arrow 40 in the FIGS. 1, 3, 4, and 6. On the oppositely positioned side relative to the insertion direction 40, the bearing support receptacle 38 is delimited by a contact section 42 of the housing part 12. The contact section 42 has a housing channel section 44 which forms a section of the intake pipe channel 14 and which is coaxial to the channel axis 24. The housing channel section 44 is illustrated in FIGS. 3 and 4. The housing channel section 44 has a round cross-section. The smallest diameter of the housing channel section 44 corresponds approximately to the smallest diameter of the channel passage 16 of the bearing support 18.

A radial inner circumferential side of the bearing support 18 that delimits the channel passage 16 is stepped once in the direction of the channel axis 24. On the side of the bearing support 18 that is facing away from the contact section 42, the bearing support 18 has a flow section 46 that forms a further section of the intake pipe channel 14 and has the smallest diameter of the channel passage 16. A radial inner circumferential side of the flow section 46 widens, viewed from the contact section 42, in the direction of the channel axis 24 in outward direction progressively, approximately like a tulip. The degree of widening increases thus with increasing spacing relative to the contact section 42.

Figure 6:
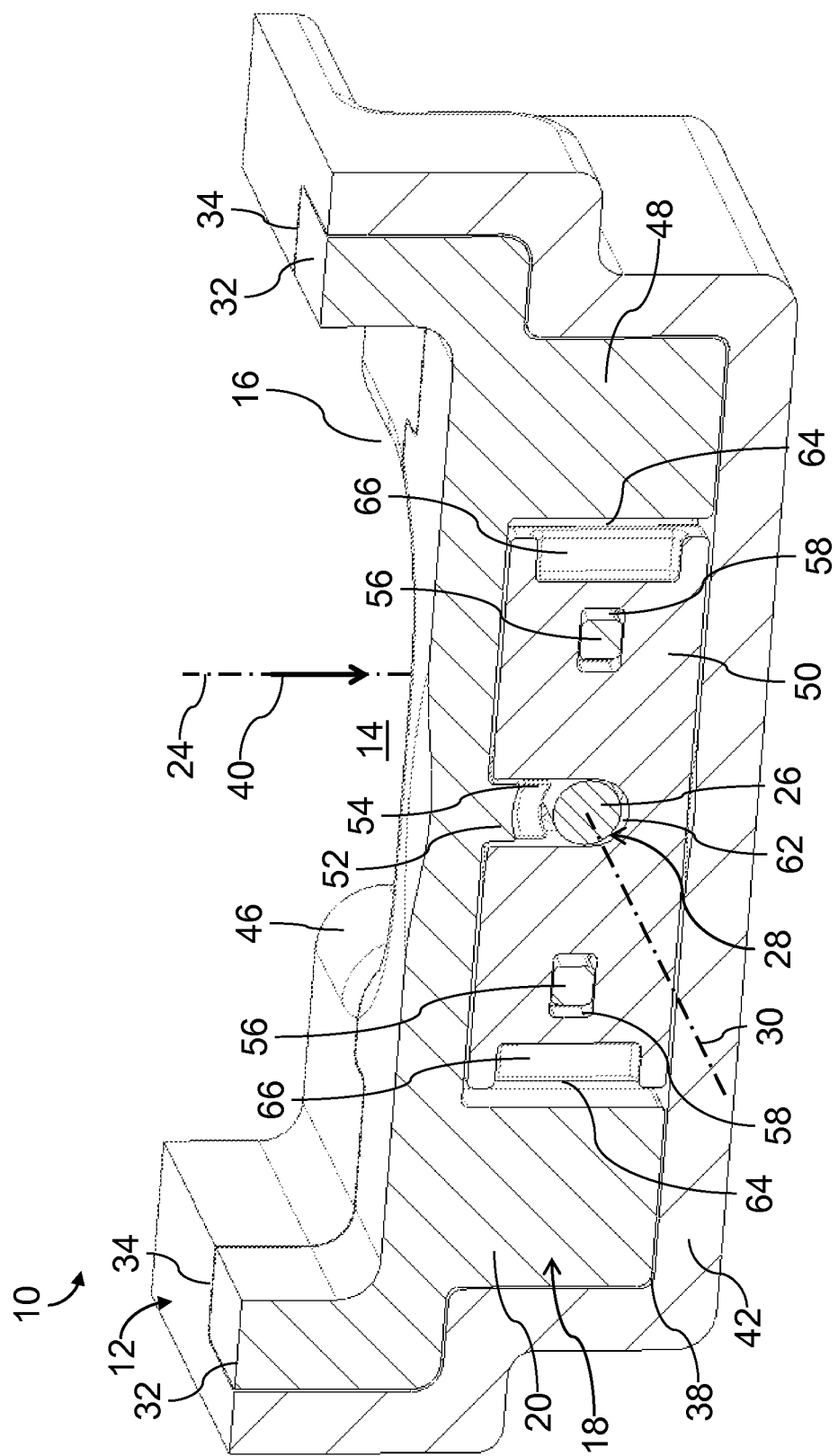
FIG. 6 is a second longitudinal section of the intake pipe section of FIGS. 1 to 4 in isometric illustration along a section line VI-VI of FIG. 2, which is perpendicular to the section line III-III of FIGS. 3 and 4.

The flow section 46 is adjoined, adjacent to a step, by a receiving section 48 which is illustrated in FIGS. 3, 4, and 6. The expansion of the receiving section 48 perpendicular to the channel axis 24 is greater than the smallest diameter of the flow section 46. The receiving section 48 serves for receiving an insert body 50. The receiving section 48, viewed axially relative to the channel axis 24, has a rectangular cross-section.

At the transverse sides of the receiving section 48, which are radially inwardly positioned relative to the channel axis 24 and in which the bearing receptacles 36 are located, a guide projection 52 is arranged at the radial inner circumferential side, respectively. The center planes of the guide projections 52 are located in the plane that is defined by the channel axis 24 and the shaft axis 30. The guide projections 52 extend respectively axially to the channel axis 24 away from the flow section 46 and axially to the shaft axis 30. The free end faces of the guide projections 52 on the side that is facing the contact section 42 are shaped in accordance with a cylinder wall which is coaxial to the shaft axis 30. The guide projections 52 engage each an insertion slot 54 of the insert body 50. The bearing receptacles 36 are located immediately behind the guide projections 52, viewed axially relative to the channel axis 24.

The longitudinal sides of the receiving section 48, which are radial inwardly positioned relative to the channel axis 24 and are parallel or, as a result of a mold taper, slightly angled relative to the plane that is defined by the channel axis 24 and the shaft axis 30, are planar.

Moreover, each bearing support half 20 and 22 has two guide pins 56 that are illustrated in FIG. 6. The guide pins 56 extend each parallel to the shaft axis 30. Imaginary center axes of the guide pins 56 extend in a plane with the shaft axis 30 which extends perpendicularly to the channel axis 24. The guide pins 56 are each monolithically joined with the radial inner transverse sides of the receiving section 48. The guide pins 56 engage corresponding pin openings 58 of the insert body 50.

In a plan view viewed axially relative to the channel axis 24, the insert body 50 has a rectangular cross-section. Its radial outer circumferential side is approximately complementary to the radial inner circumferential side of the receiving section 48. Its transverse sides or walls 60 which are each facing the transverse sides of the bearing support 18 are appropriately stepped relative to them.

In the transverse sides or walls 60 a continuous shaft passage 62 for the flap shaft 26 is arranged, respectively. The shaft passages 62 extend coaxially to the shaft axis 30. The above mentioned insertion slots 54 extend each from the free end face of the insert body 52 to the shaft passages 62 so that the flap shaft 26 can be inserted through the insertion slots 54 into the shaft passages 62.

The longitudinal sides or walls 64 of the insert body 50, as shown in FIG. 6, have depressions 66.

A radial outer expansion of the insert body 50 axial to the shaft axis 30 is smaller than a spacing of the radial inner circumferential sides of the transverse sides of the bearing support 18. In this way, the insert body 50 can move in the receiving section 48 axially relative to the shaft axis 30. In its center position, which is illustrated in FIGS. 3 and 4, there remains a gap 68, respectively, between the radial outer circumferential sides of the transverse sides or walls 60 of the insert body 50 and the radial inner circumferential sides of the receiving section 48.

At the radial inner circumferential side of the insert body 50 the shaft passages 62 are each surrounded by a recess 70. The recesses 70 serve for guiding follower collars 72 which are connected monolithically and fast with the flap shaft 26. The follower collars 72 are arranged coaxially to the shaft axis 30 on the flap shaft 26.

The radial inner circumferential side of the insert body 50 forms a further section of the intake pipe channel 14. The radial inner circumferential side of the insert body 50 is coaxial to an insert body axis which, in the center position of the insert body 50, defines the channel axis 24 or corresponds to it. The smallest inner cross-section of the insert body 50, viewed axially to the channel axis 24, is located at the level of imaginary axes of the shaft passages 62, i.e., in the mounted state at the level of the shaft axis 30. The interior of the insert body 50 widens, respectively, toward the open end faces. The profile of the radial inner circumferential side of the insert body 50 between its smallest inner cross-section and the open end faces is approximately S-shaped, respectively. In this way, when viewed from the level of the shaft axis 30, a tulip shape of sorts results, respectively. At the end face which is facing the flow cross-section 46 of the bearing support 18, the inner contour of the insert body 50 passes almost continuously into the inner contour of the flow section 46.

On the end face that is facing the contact section 42 of the housing part 12, a radial inner rim of the insert body 50 is rounded. The radial inner circumferential side of the housing channel section 44 of the housing part 12 progressively widens, viewed axially relative to the channel axis 24, toward the insert body 50.

On the flap shaft 26 a flap 74 is mounted fixedly. In FIGS. 1 to 6 only a detail of the intake pipe 10 with an intake pipe channel 14 and a flap 74 is illustrated. In reality, the intake pipe 10, depending on the number of cylinders of the internal combustion engine, has several such intake pipe channels 14 with appropriate flaps 74 and insert bodies 50. The flap 74 is form-fittingly arranged on the flap shaft 26. Preferably, it is injection-molded onto the flap shaft 26. The flap 74 is located between the two follower collars 72. An outer cross-section of the flap 74 corresponds approximately to an inner cross-section of the insert body 50 at its smallest cross-section at the level of the imaginary axes of the shaft passages 63, i.e., at the level of the shaft axis 30 in the mounted state. In this way, in its closed position, which is indicated in FIGS. 1 to 4 and 6, the flap 74 is ideally arranged without any gap in the insert body 50 and closes it off and thus the intake pipe channel 14.

For opening the intake pipe channel 14, the flap 74 can be rotated by means of the flap shaft 26 relative to the insert body 50 about the shaft axis 30. For this purpose, the flap shaft 26 is driven in a way not of interest in this context by means of an appropriate drive device. The drive device can preferably be controlled by an engine control unit, preferably depending on an operating state of the internal combustion engine, for example, an engine speed.

The insert body 50 can move within the receiving section 48 axially relative to the shaft axis 30 so that possible manufacturing-related and/or operation-related tolerances between the flap shaft 26, the flap 74, and the bearing support 18 can be compensated. Operation-related tolerances can be caused, for example, by different thermal expansions of the employed components, for example, the flap shaft 26, the flap 74, the bearing support 18, and/or the housing part 12.

When moving axially relative to the shaft axis 30, the insert body 50 is guided by means of the guide pins 56 and the corresponding pin openings 58. In this way, it is prevented that the insert body 50 can turn about the shaft axis 30 relative to the bearing support 18.

For mounting the intake pipe 10, the housing part 12, the bearing support halves 20 and 22, the flap shaft 26 with the flap 74, and the insert body 50 are pre-manufactured as separate components. In accordance with an embodiment of the intake pipe 10, several flaps 74, insert bodies 50, and bearing supports 18 are required.

The bearing support halves 20 and 22 are provided with the appropriate plain bearing bushings and are arranged on the flap shaft 26 on both sides of the flap 74 at a spacing thereto.

The insert body 50 is inserted, with the insertion slots 54 leading, into the receiving section 48 wherein the flap shaft 26 is inserted into the insertion slots 54.

The bearing support halves 20 and 22 are moved axially relative to the shaft axis 30 toward each other wherein the guide pins 56 engage the respective pin openings 58 of the insert body 50.

The bearing support 18, with the flap shaft 26 and the mounted insert body 50, is inserted in insertion direction 40 into the bearing support receptacle 38 so that the receptacle section 48 of the bearing support 18 and the free end face of the insert body 50 are resting on the contact section 42 of the housing part 12. The welding anvils 32 of the bearing support halves 20 and 22 are inserted into receptacles 34 of the housing part 12. The welding anvils 32 are welded to the housing part 12.

With the above-described embodiment of an intake pipe 10 the following modifications are possible inter alia.

The invention is not limited to an intake pipe 10 of an internal combustion engine of a motor vehicle. Instead, it can also be used in other types of internal combustion engines, for example, in industrial motors.

The intake pipe channel 14, in particular the flow section 46 of the channel passage 16, the radial inner circumferential side of the insert body 50, and/or the housing channel section 44, can have, instead of having a round inner cross-section, also a different one, for example, an oval, rectangular or diamond-shaped one.

The flap 74, instead of being form-fittingly injection-molded onto the flat shaft 26, can also be connected fixedly on the flap shaft 26 in other ways.

The orientation of the shaft axis 30 relative to the channel axis 24 and to the contact plane of the bearing support halves 20 and 22 is not mandatorily perpendicular. Other relative orientations are also possible.

While specific embodiments of the invention have been shown and described in detail to illustrate the inventive principles, it will be understood that the invention may be embodied otherwise without departing from such principles.

What is claimed is:

1. An intake pipe for intake gas of an internal combustion engine, the intake pipe comprising:
   at least one intake pipe channel;
   at least one flap unit comprising an elongated flap shaft and at least one flap fixedly arranged on the flap shaft, wherein the at least one flap unit is adapted to alternatingly open or close the at least one intake pipe channel by rotating the flap shaft on a shaft axis defined by a direction of elongation of the flap shaft;
   a hollow insert body disposed in the at least one intake pipe channel, wherein the at least one flap unit is arranged in the insert body and wherein the at least one flap is positioned in a hollow interior of the insert body;
   wherein the insert body has opposite end faces and the opposite end faces are open;
   wherein the flap shaft extends through opposite walls of the insert body in a radial direction relative to an insert body axis of the insert body;
   wherein the insert body is rotatable on the flap shaft;
   wherein a radial inner circumferential side of the insert body widens toward at least one of the open end faces,
   an intake pipe housing in which the intake pipe channel is arranged;
   a bearing support arranged in the intake pipe housing and comprising
   an insert body receptacle;
   wherein the insert body is arranged slidably on the flap shaft, the insert body slidable in an axial direction defined by the shaft axis, the insert body axially slidable relative to the at least one flap, and slidable relative to the bearing support such that manufacturing-related and/or operation-related tolerances between the flap shaft, the at least one flap, and the bearing support can be compensated.

2. The intake pipe according to claim 1, wherein
   an inner diameter of the insert body relative to the insert body axis matches an outer diameter of the at least one flap at an axial height of the insert body axis where a shaft axis of the flap shaft is located.

3. The intake pipe according to claim 1, wherein
   the intake pipe housing has at least one guide element adapted to guide the insert body axially relative to the shaft axis of the flap shaft.

4. The intake pipe according to claim 3, wherein
   the at least one guide element is arranged on the bearing support.

5. The intake pipe according to claim 1, wherein
   an inner contour of a radial inner circumferential side of a section of the intake pipe channel that is neighboring the insert body passes into an inner contour of the radial inner circumferential side of the insert body.

6. The intake pipe according to claim 1, wherein
   the opposite walls of the insert body each have a shaft passage for passing the flap shaft therethrough, respectively,
   wherein the opposite walls each have an insertion slot through which the flap shaft is inserted into the shaft passages, respectively,
   wherein the insertion slots extend from the shaft passages to one of the open end faces of the insert body, respectively.

7. An intake pipe for intake gas of an internal combustion engine, the intake pipe comprising:
   at least one intake pipe channel;
   at least one flap unit comprising a flap shaft and at least one flap fixedly arranged on the flap shaft, wherein the at least one flap unit is adapted to alternatingly open or close the at least one intake pipe channel;
a hollow insert body disposed in the at least one intake pipe channel, wherein the at least one flap unit is arranged in the insert body and wherein the at least one flap is positioned in a hollow interior of the insert body;
wherein the insert body has opposite end faces and the opposite end faces are open,
wherein the flap shaft extends through opposite walls of the insert body in a radial direction relative to an insert body axis of the insert body,
wherein the insert body is rotatable on the flap shaft,
wherein a radial inner circumferential side of the insert body widens toward at least one of the open end faces,
an intake pipe housing in which the intake pipe channel is arranged;
wherein the insert body is slidable in a direction of a shaft axis of the flap shaft relative to the intake pipe housing,
a bearing support arranged in the intake pipe housing and comprising
an insert body receptacle;
wherein the bearing support supports the flap shaft,
wherein the insert body is arranged slidably in the direction of the shaft axis of the flap shaft in the insert body receptacle,
an inner contour of the radial inner circumferential side of the insert body passes into an inner contour of a radial inner circumferential side of the insert body receptacle;
wherein the radial inner circumferential side of the insert body receptacle widens, viewed in an axial direction of the insert body axis, away from the insert body.

8. The intake pipe according to claim 7, wherein
an inner contour of a radial inner circumferential side of a section of the intake pipe channel that is neighboring the insert body receptacle passes into the inner contour of the radial inner circumferential side of the insert body receptacle.

9. An intake pipe for intake gas of an internal combustion engine, the intake pipe comprising:
at least one intake pipe channel;
at least one flap unit comprising a flap shaft and at least one flap fixedly arranged on the flap shaft, wherein the at least one flap unit is adapted to alternatingly open or close the at least one intake pipe channel;
a hollow insert body disposed in the at least one intake pipe channel, wherein the at least one flap unit is arranged in the insert body and wherein the at least one flap is positioned in a hollow interior of the insert body;
wherein the insert body has opposite end faces and the opposite end faces are open,
wherein the flap shaft extends through opposite walls of the insert body in a radial direction relative to an insert body axis of the insert body,
wherein the insert body is rotatable on the flap shaft,
wherein a radial inner circumferential side of the insert body widens toward at least one of the open end faces,
an intake pipe housing in which the intake pipe channel is arranged;
wherein the insert body is slidable in a direction of a shaft axis of the flap shaft relative to the intake pipe housing,
wherein the intake pipe housing has at least one guide element adapted to guide the insert body axially relative to the shaft axis of the flap shaft,
wherein that the at least one guide element includes a guide pin or a pin opening,
wherein the guide pin or the pin opening extends parallel to the shaft axis of the flap shaft,
wherein the guide pin, when moved axially relative to the shaft axis of the flap shaft, engages an appropriate pin opening of the insert body, or the pin opening, when moved axially relative to the shaft axis of the flap shaft, is engaged by a guide pin of the insert body.

\* \* \* \* \*